(12) United States Patent
Grabau

(10) Patent No.: US 7,690,875 B2
(45) Date of Patent: Apr. 6, 2010

(54) TRANSPORTING AND STORING CURVED WIND TURBINE BLADES

(75) Inventor: Peter Grabau, Kolding (DK)

(73) Assignee: LM Glasfiber A/S, Lünderskov (DK)

( * ) Notice: Subject to any disclaimer, the term of this patent is extended or adjusted under 35 U.S.C. 154(b) by 1125 days.

(21) Appl. No.: 10/563,665

(22) PCT Filed: Jul. 9, 2004

(86) PCT No.: PCT/DK2004/000497

§ 371 (c)(1),
(2), (4) Date: Jan. 6, 2006

(87) PCT Pub. No.: WO2005/005286

PCT Pub. Date: Jan. 20, 2005

(65) Prior Publication Data

US 2006/0251517 A1     Nov. 9, 2006

(30) Foreign Application Priority Data

Jul. 10, 2003   (DK) ............................. 2003 01051

(51) Int. Cl.
*B60P 7/08*       (2006.01)

(52) U.S. Cl. ............................. 410/45; 410/34; 410/44
(58) Field of Classification Search .................. 410/34, 410/44, 45, 53; 280/404
See application file for complete search history.

(56) References Cited

U.S. PATENT DOCUMENTS 7,326,013 B2 *   2/2008   Heuvel et al. ................. 410/44

FOREIGN PATENT DOCUMENTS

| WO | WO9914490 | 3/1999 |
| WO | WO02083523 | 10/2002 |

* cited by examiner

*Primary Examiner*—Stephen Gordon
(74) *Attorney, Agent, or Firm*—Cooper & Dunham LLP

(57) ABSTRACT

A method of transporting and storing a wind turbine blade includes providing a wind turbine blade including a blade root having a longitudinal central axis and a blade tip. The wind turbine blade curves in an unloaded state in such a manner that the blade presents a substantially concave face and a substantially convex face, and such that the blade tip is spaced apart from the longitudinal central axis of the blade root. The wind turbine blade is prestressed at a distance from the blade root in such a manner that the blade tip is brought closer to the longitudinal central axis of the blade root.

16 Claims, 7 Drawing Sheets

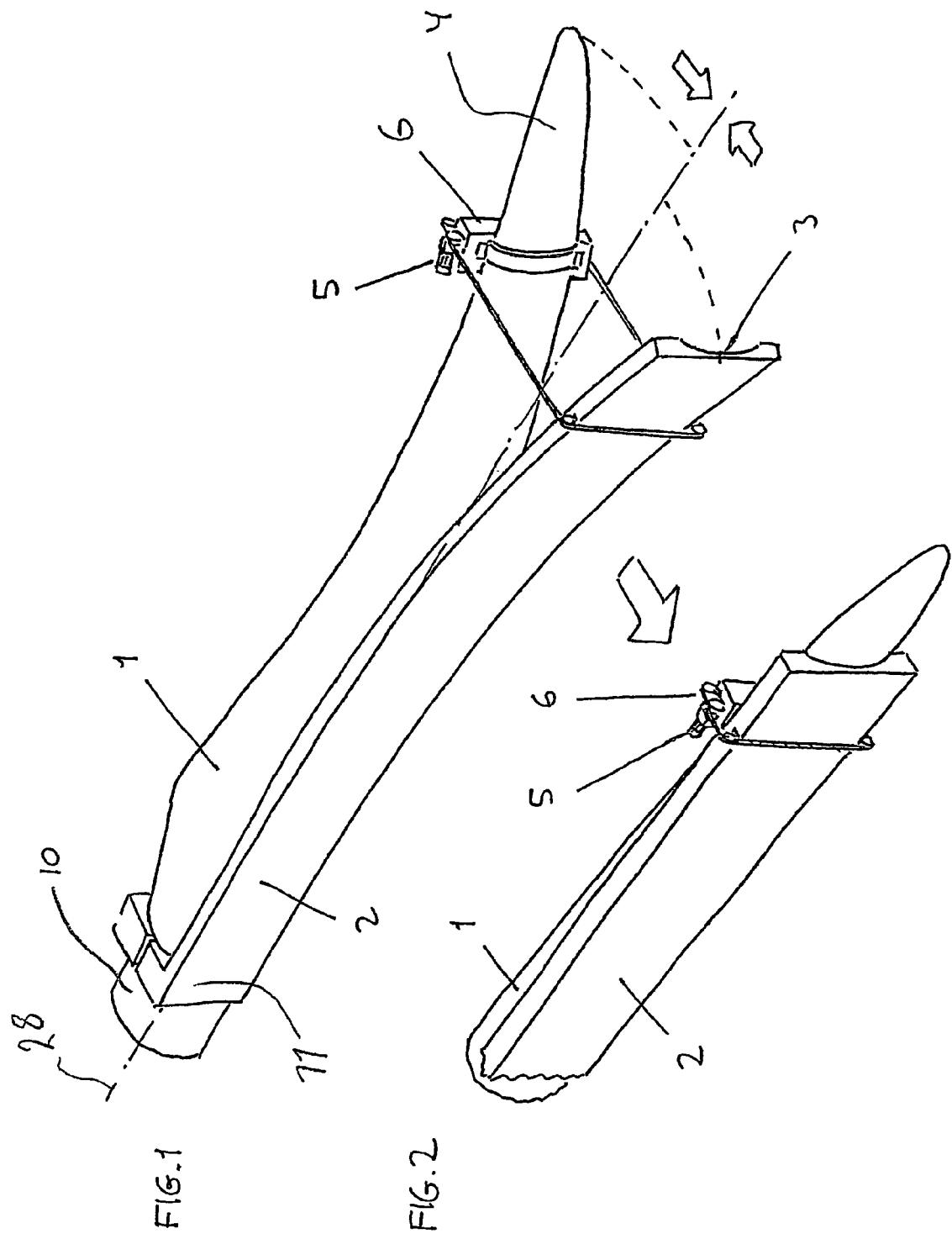

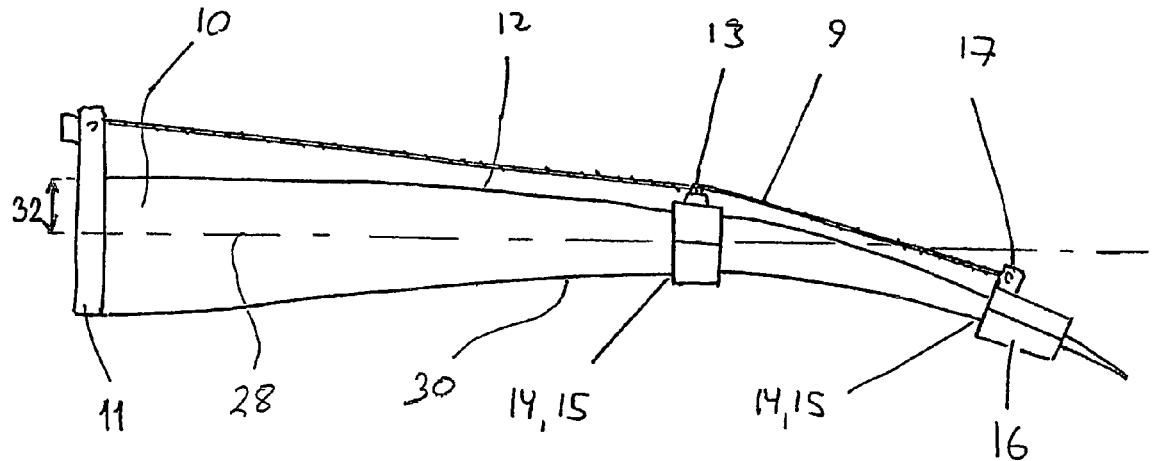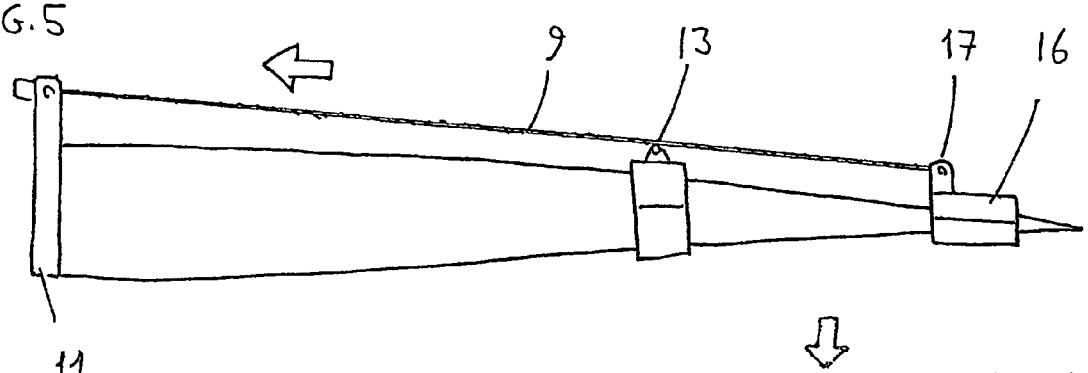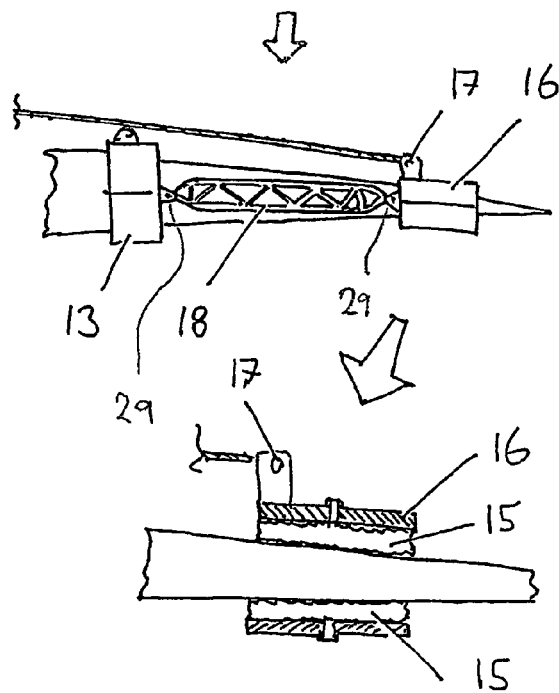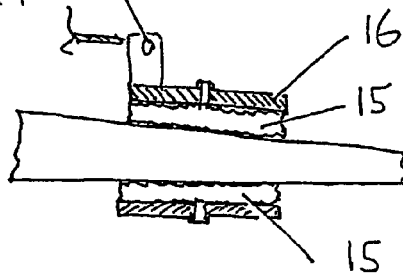

TRANSPORTING AND STORING CURVED WIND TURBINE BLADES

TECHNICAL FIELD

The invention relates to the transportation and storing of a wind turbine blade including a blade root and a blade tip, where the wind turbine blade curves in the unloaded state in such a manner that the wind turbine blade presents a substantially concave face and a substantially convex face, and such that said blade tip is spaced apart from the longitudinal central axis of said blade root. The invention further relates to a wind turbine blade of the above type as well as an apparatus for transporting and storing a wind turbine blade of the above type.

BACKGROUND ART

It is commonly known to transport fibre-reinforced polymer blades for modern wind turbines generating electricity by truck, by train or by ship. In order to include as many blades as possible at each transport, the blades are often packed upended in relation to each other. For example, three blades are often packed so that two roots are arranged at the one end interspaced by one blade tip, thus resulting in only one root and two blade tips being arranged at the other end.

Another example of a known packing method is disclosed in WO 02/083523, where the blades are arranged in frames secured at the blade root and the blade tip, respectively, and then joined with an upended blade arranged in corresponding frames. As a result, the blades may be arranged modularly close together in both the horizontal and the vertical plane.

During recent years, several wind turbine blade manufacturers have started manufacturing blades designed so that they curve away from the tower when mounted. The blade thus curves in the unloaded state in such a manner that the wind turbine blade presents a substantially concave face and a substantially convex face. The expression concave face refers to the face of the blade from which the longitudinal, geometrical centre line of the blade bents inwardly. The expression convex face refers to the face of the blade from which the longitudinal centre line of the blade bents outwardly. When the blade is mounted so that the blade tip curves away from the tower, the convex face thus faces the tower and the concave face faces away from the tower. In this way, an increased distance is ensured between the blade tip and the tower, which is desirable in order to reduce the risk of the often very long blades bending due to the wind pressure and hitting the tower during high wind. WO 99/14490 discloses such a solution.

The industry has provided examples of blades of a length of 54 meters and above being manufactured with a curvature of only approx. two meters, primarily due to the subsequent and necessary transportation from the manufacturing site to the application site/mounting site.

However, the present and increasing blade lengths have given rise to an increasing demand for the manufacture of blades with a significantly greater curvature in order to minimise or rather maintain an acceptably small projection on the nacelle.

Thus, it is also desirable to be able to transport blades having a significantly greater curvature than approx. two meters, which is hardly possible by using the known methods of transporting blades of this type to wind power plants.

DISCLOSURE OF INVENTION

According to a first aspect, the object of the invention is to provide a method of facilitating the storage and transportation of a curved blade for a wind turbine without the storage or the transportation being considerably impeded by the shape of the blade.

The object of the invention is obtained by a method where the blade is prestressed by means of prestressing means at a distance from the blade root in such a manner that the blade tip is brought closer to the longitudinal central axis of the blade root. The longitudinal central axis of the blade root should be interpreted as a straight line extending through the centre of the blade root and perpendicular to the plane of the root flange. As a result, the blade may be arranged in a less curved shape, thereby facilitating storage and transportation. Usually, modern wind turbine blades are transported by truck or ship across great distances. When these blades curve heavily, they may cover the entire width of the road or more when the blade is arranged so that the curvature extends in a horizontal plane. When the blade is arranged in such a manner that the curvature extends in the vertical plane, it is often not possible to transport it under bridges, through tunnels and the like. By "straightening" out the blade by the method according to the invention, the blade is arranged in a shape allowing for transportation by truck by relatively narrow roads and under bridges, through tunnels and the like. Curved blades have hitherto been provided with smaller curvatures than desired to avoid the above disadvantages. The longer the blade, the smaller the relative curvature, which is undesirable as long blades have large deflections in high wind.

According to a preferred embodiment, the blade is prestressed so heavily that the distance between the blade tip and the longitudinal central axis of the blade root does not exceed twice the radius of the blade root, more preferably not exceeding the radius of the blade root. In this way, the blade obtains a shape substantially taking up the same space as a non-curved blade of the same size.

However, in some cases, it is also sufficient to prestress the blade to such an extent that the distance between the blade tip and the longitudinal central axis of the blade does not exceed five, four or three times the radius of the blade root.

The term radius denotes that the blade root has a substantially circular cross section. When the blade root has a different cross section, such as an elliptical cross section, radius denotes half the cross-sectional dimension of the blade root in the direction of the curvature.

According to an embodiment, the prestressing means include a counterpart extending parallel to the blade as well as prestressing members for forcing the substantially concave face of the wind turbine blade towards the counterpart. The blade root is preferably fixedly supported on the counterpart, the blade tip being pulled towards the counterpart by the prestressing members.

According to an embodiment, the counterpart may be resilient, curved and arranged parallel to the wind turbine blade in such a manner that said counterpart curves in a direction opposite the wind turbine blade, whereby the counterpart and the wind turbine blade are forced towards each other by means of the prestressing members. The counterpart may for example be made of fibre-reinforced polymer to obtain a resilience corresponding to the resilience of the blade.

Like the wind turbine blade, this counterpart is provided with a curvature ensuring that also the counterpart is prestressed when tightened to the blade. The tightening of the counterpart to the blade may for example be carried out by means of one or more electrical, hydraulic, pneumatic or manual winches mounted by straps or the like on either the counterpart or at the outermost portion of the wind turbine blade, preferably at the tip portion. As a result, the blade tip and the counterpart may be pulled towards each other in such a manner that the wind turbine blade is completely or partially straightened out and fixed in this position for storage and transportation.

The above method even allows for the transportation of blades for wind turbines having a pronounced curvature by means of conventional transportation means. Optionally, the necessary prestressing may be performed during transportation when narrow or low obstacles are to be passed.

The mentioned embodiments may advantageously include a mobile winch arrangement which may be moved to other blades/counterparts for prestressing and securing these in this position. This mobile winch arrangement may be remounted when unpacking the blades to avoid an instantaneous release of the blade from the counterpart. However, a different and more manual solution suitable for releasing the blade and the counterpart from the prestressed position may, of course, also be used.

According to an alternative embodiment, the counterpart is substantially rectilinear and substantially rigid, the wind turbine blade being forced towards the counterpart by means of the prestressing members. This "rigid" counterpart may be of a U-shaped latticework which is fastened to the blade at its innermost portion, preferably at the blade root. The rigid counterpart may as mentioned in the above embodiment also be provided with one or more winches transmitting the necessary force to the blade by means of straps and suitable pull yokes or the like fixed onto the blade and onto the counterpart. When the blade is in its desired position, it is fastened to the counterpart.

In a preferred embodiment, the rigid latticework includes a substantially plane bottom wall and two flange walls, said flange walls substantially being rectilinear and following the outer outline of the blade. The counterpart may advantageously be adapted such that the flange walls are hinged or removably fastened to the bottom wall, thereby allowing said flange walls to be folded down during the transport of the empty counterpart.

Both a resilient and a rigid counterpart may be shaped or have abutment members shaped to allow the blade to abut the counterpart leniently without damaging the surface of the blade.

According to an embodiment, the resilient counterpart may be formed of a second curved wind turbine blade upended in relation to the first blade, whereby the roots of the two blades are secured in respective first frames, and whereby the tips of the two blades are secured in respective second frames, and where said first frame of said first blade and said second frame of said second blade are secured to each other and where said second frame of said first blade and said first frame of said second blade are subsequently forced towards each other and secured to each other. As a result, the blades may be stored and transported two by two in a very simple and compact way.

Optionally, the first frame of the first blade and the second frame of the second blade may be forced towards each other and secured to each other, said second frame of said first blade and said first frame of said second blade being forced towards each other and secured to each other subsequently or simultaneously.

According to an embodiment, the prestressing means include a cable secured to the blade at a position adjacent to the blade tip and positioned so as to extend along the convex face of the blade, said cable being tightened in such a manner that the blade tip is brought closer to the longitudinal central axis of the blade root. The cable may be fastened to the blade by means of root fittings at the blade root and may be guided at the convex face of the blade to an area adjacent to the blade tip. At the blade tip, the hauling cable is secured to blade tip fittings fastened to the blade and preferably being formed as a type of bushing optionally being displaced over the blade from the blade tip. On the convex face of the blade, this bushing may be provided with a suitable projecting arm in which the hauling cable is secured. A moment of force is thus applied to the resilient blade by pulling this hauling cable and the blade is thereby straightened out until the desired "rectilinearity" is obtained.

According to a particularly preferred embodiment, at least one set of cable guide fittings, optionally in the form of a bushing, is mounted between the two previously mentioned fitting members in order to ensure that the surface of the wind turbine blade is not damaged by the hauling cable. This bushing can exert a compressive force on the convex face of the blade at a distance from the tip when the cable is tightened. This effect is further ensured by the two or more bushings being interconnected with compression members of a suitable type.

The mentioned bushings may on their inner faces be provided with means, for example air cushions or the like means, ensuring that the surface of the blade is not damaged by the prestressing.

According to an embodiment, the blade is positioned with the concave face facing downwards and at least the blade root is supported, the prestressing means being formed by ballast means positioned on or in the blade at a distance from the blade root. As a result, gravity may be utilised to straighten out the blade to a more or less extent.

The blade may, of course, be supported both at the blade root and at the blade tip.

According to an embodiment, the blade is transported in the prestressed state by means of a tractor unit and a trailer or semi-trailer optionally formed integral with a counterpart towards which the blade is forced. In order to obtain the desired prestressing of the blade, said blade may be, depending on the orientation of the blade, pulled towards the base either at the tip or at an area between the tip and the root.

By this method, it is also advantageous to use a winch arrangement and a pull yoke suitable for the geometry of the blade for prestressing the blade.

When the blade is arranged in such a manner that the concave face thereof faces upwards in the unloaded state, the pull is to be carried out at the tip. However, this solution cannot be used when the prestressing requires forces capable of lifting the vehicle or the trailer completely or partially of the ground.

When the blade is arranged in such a manner that the convex face thereof faces upwards, the pull is to be carried out from an area between the tip and the root. However, this solution requires that the connecting member between the front end and the rear end of the vehicle is designed so as to be capable of transmitting the required force.

A variant of this solution may be to mount a ballast of a suitable weight on strategic positions on or in the blade. The ballast, which inter alia may be in form of water or another suitable material, may optionally cooperate with the mentioned prestressing mechanism or act solely with its dead load.

The invention also relates to a wind turbine blade having inner ballast tanks.

In yet another embodiment of the invention, a curved blade for a wind turbine may be transported together with a tower section for a wind turbine. By using this solution, the rigidity of the tower may be used as a counterpart, completely or partially surrounding the blade along the length of this. In order to "straighten out" the blade, a plurality of suitably inter-spaced fittings are mounted, said fittings being adapted and designed to guide the blade into a horizontally arranged tower section.

These fittings may be provided with a plurality of wheels or the like arranged around the blade such that the blade by means of these wheels is supported against the inner surface of the tower section.

When, for example, a truck is used for the transportation, the blade may be mounted at the blade root on the tractor unit and from there be backed into a waiting tower section mounted on a flatbed trailer or the like. In this way, the blade is forced into a prestressed position. When the blade is in place in the tower section, the flatbed trailer may be coupled with the tractor unit, and the trailer train is ready to depart.

The invention further relates to an apparatus for transporting and storing a wind turbine blade including a blade root and a blade tip, where the wind turbine blade curves in the unloaded state in such a manner that the blade presents a substantially concave face and a substantially convex face, and such that said blade tip is spaced apart from the longitudinal central axis of said blade root, said apparatus including prestressing means for loading the blade at a distance from the blade root in such a manner that the blade tip is brought closer to the longitudinal central axis of the blade root.

According to the invention, the prestressing means of the apparatus may include a counterpart adapted to being arranged parallel to the blade, said prestressing means further including prestressing members for forcing the substantially convex face of the blade towards the counterpart.

According to the invention, the apparatus may include root fittings adapted so as to allow a blade root to be tightened thereto.

According to the invention, the counterpart is in the form of a trailer or a semi-trailer adapted to being pulled by a tractor unit.

BRIEF DESCRIPTION OF THE DRAWINGS

The invention is explained in detail below with reference to the drawings, in which FIG. 1 is a wind turbine blade for a wind turbine in the process of being prestressed by means of a resilient counterpart, FIG. 2 shows the same as in FIG. 1 where the blade is prestressed.

FIG. 4 is a wind turbine blade being prestressed by means of an axial hauling cable, FIG. 5 shows the same as in FIG. 4, but where the blade is prestressed, FIG. 6 is a segment of FIG. 4 and FIG. 5 with an additional detail, FIG. 7 is a partially sectional view of another detail from FIG. 4 and FIG. 5

BEST MODES FOR CARRYING OUT THE INVENTION

Figure 3:
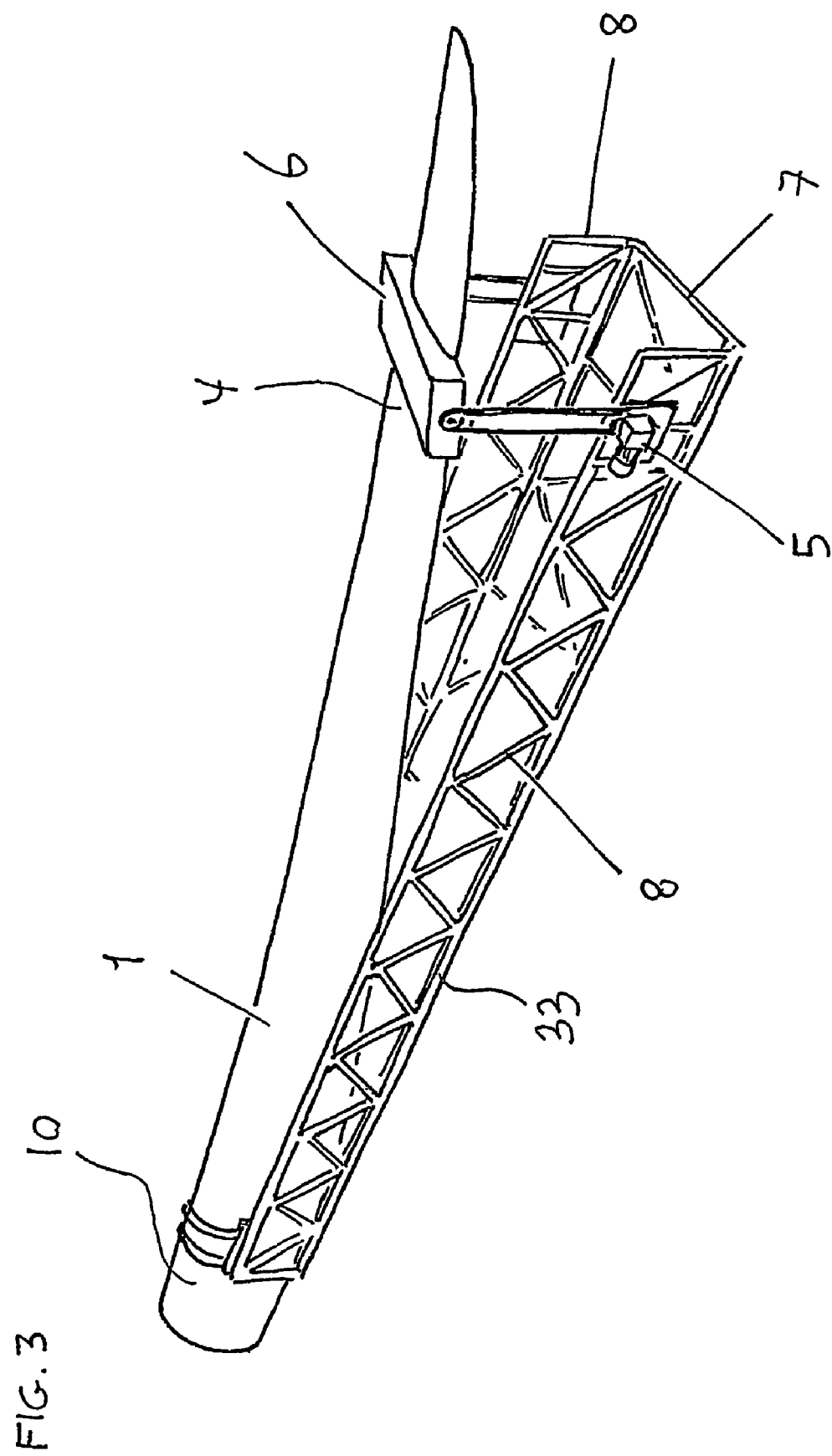
FIG. 3 is a wind turbine blade is in the process of being prestressed in a rigid lattice counterpart.

FIG. 1 shows a resilient curved blade 1 mounted on a resilient counterpart 2 having an inner outline 3 adapted to the outer outline of the blade. The resilient counterpart is secured to the blade 1 at the root 10 thereof by means of root fittings 11 receiving the cylindrical outline of the root 10. At the outermost portion of the counterpart 2 and the blade 1, a winch arrangement 5 is mounted by which the blade 1 and the counterpart 2 may be pulled towards each other and thereby straightened out, as shown in FIG. 2. The winch arrangement 5 shown may be removable and thereby mobile such that it may be used for prestressing several blades 1 for the same transport or storage. At delivery, the winch arrangement 5 may also be included and used for unpacking the prestressed blades 1. The longitudinal central axis of the blade root has been denoted by the reference numeral 28.

FIG. 3 shows a counterpart 33 structured as a rigid latticework which, in principle, is used in same way as the counterpart 2 shown in FIGS. 1 and 2. However, the difference between the two is that this counterpart 33 is not provided with a resilience corresponding to the resilience of the blade. By means of this counterpart 33, the blade is also prestressed by use of a winch arrangement 5 prestressing the blade 1 by a suitable pull yoke 6. The lattice counterpart 33 is shaped as a U-section and includes a bottom wall 7 and two flange walls 8. During the transportation of this type of counterpart 33, the flange walls 8 may be folded down onto the bottom wall 7 by using not-shown hinge devices, whereby the space requirement is considerably reduced.

Another solution is shown in FIG. 4, where a longitudinal hauling cable 9 is used for the prestressing. At the root 10 of the blade, the hauling cable 9 is secured to root fittings 11 and guided along the convex face 12 of the blade towards the tip 4 of the wind turbine blade. Between the root 10 and the tip 4, the cable 9 is guided through or above cable guide fittings in the form of an intermediate bushing 13 mounted around the blade 1. The bushing 13 is on its faces 14 abutting the blade 1 provided with an inner surface coating 15, which does not damage the surface of the blade. This intermediate bushing 13 serves two purposes; i.e. to prevent the hauling cable 9 from touching the blade 1 and to contribute to transmitting tractive forces and flexural forces to the blade 1 during the prestressing.

At the tip 4 of the blade, blade tip fittings are mounted in the form of a tip bushing 16 corresponding to the geometry of the blade and provided with a projecting arm 17 in which the hauling cable 9 is secured.

FIG. 5 shows the blade 1 in a prestressed state as per the above description.

FIG. 6 shows details, where the intermediate bushing 13 and the tip bushing are inter-connected by means of a rigid distance beam 18, the purpose thereof being to ensure a controlled transmission of forces from the hauling cable 9 to the blade structure. The intermediate bushing 13 may be provided with a roller or a sliding surface for reducing the friction between the cable and the intermediate bushing during the prestressing process. The distance beam is connected to the intermediate bushing 13 and the blade tip bushing 16 by hinges 29.

FIG. 7 shows details of a tip bushing 16 being inwardly provided with inflatable air cushions 15 ensuring that the surface of the blade is not damaged by the prestressing of the blade 1.

Figure 8:
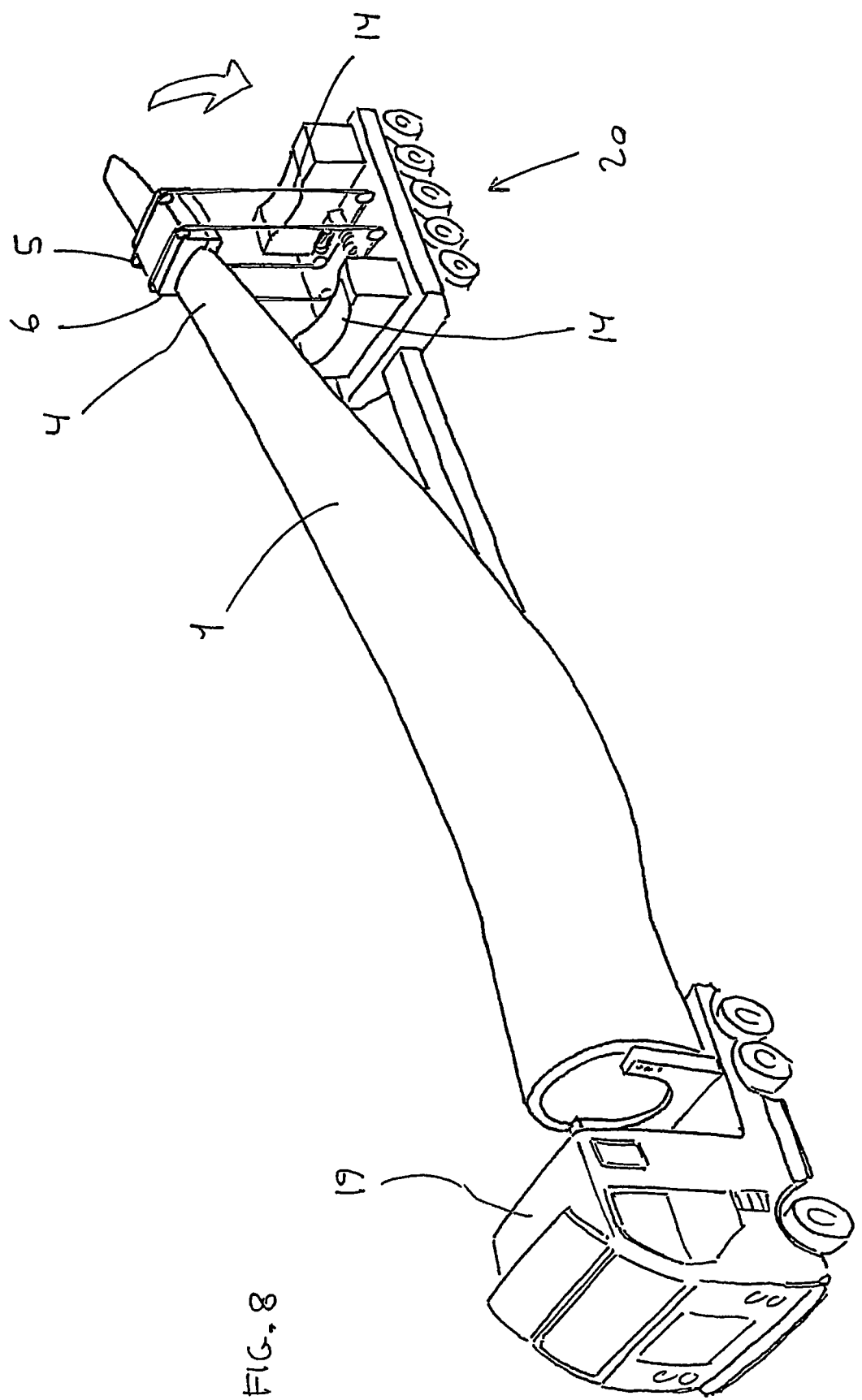
FIG. 8 is a wind turbine blade in the process of being prestressed on a truck.

Another method of transport according to the invention is shown in FIG. 8 illustrating a truck 19 loaded with a wind turbine blade 1 in the process of being prestressed towards the rear end 20 of the truck. This prestressing is carried out by means of a suitable winch arrangement 5 pulling the blade 1 downwards towards suitable abutment faces 14. FIG. 8 only shows the pulling of the blade 1 at the tip end 4. However, the invention is not limited to only including the use of one winch arrangement 5. Several winch arrangements 5 may be used in the longitudinal direction of the wind turbine blade 1.

Figure 9:
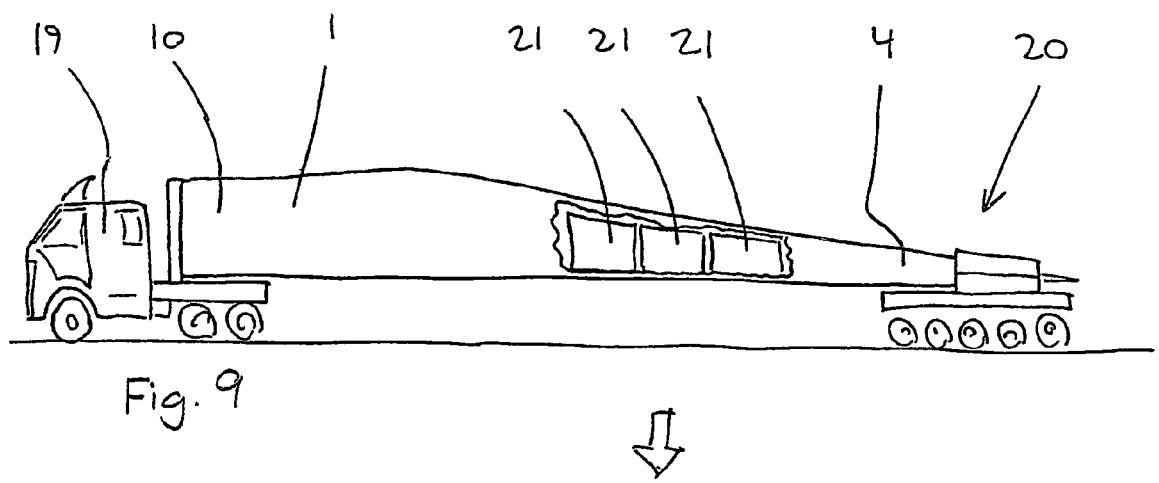
FIG. 9 is a wind turbine blade on a truck, where the blade contains an inner ballast.
Figure 10:
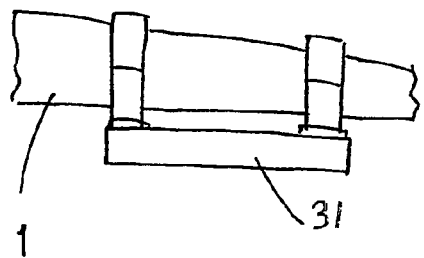
FIG. 10 is a segment of a wind turbine blade with outer ballast.

FIG. 9 also shows a wind turbine blade 1 being mounted on a truck 19 and being ready for transport. It appears that the blade 1 is inwardly provided with ballast 21, for example water, exerting the force necessary for sufficiently straightening out the blade 1 prior to transport. Optionally, the necessary prestressing may be carried out during the transport, where narrow or low obstacles are to be passed. FIG. 10 shows a variant where an outer ballast 31, for example made of concrete or steel, is mounted under the wind turbine blade 1.

Figure 11:
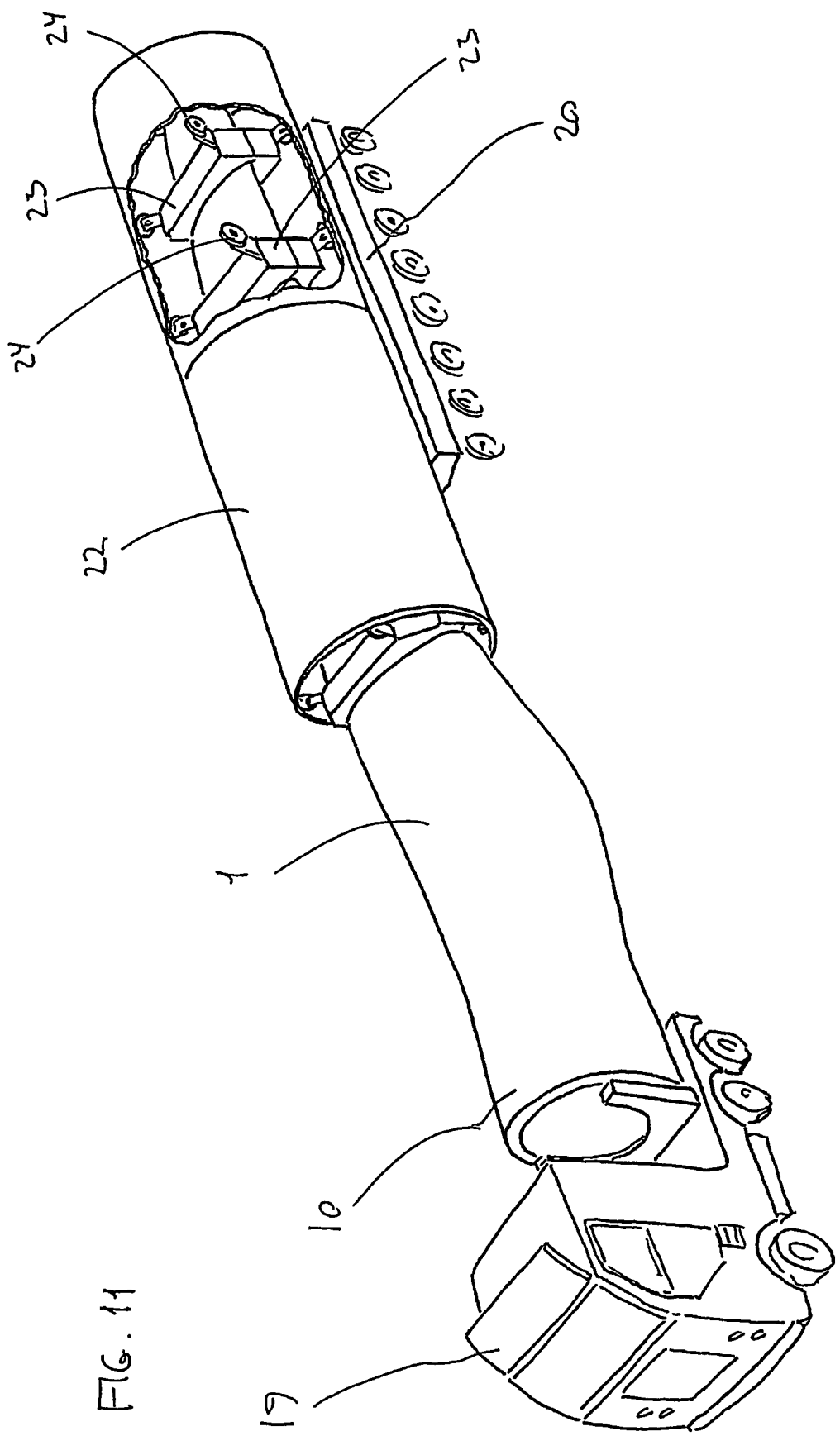
FIG. 11 is a wind turbine blade being arranged and prestressed in a tower section.

FIG. 11 shows a truck 19 being prepared for performing a combined transportation including a wind turbine blade 1 for a wind turbine as well as a tower section 22 for a wind turbine. This solution uses the tower 22 as a counterpart 2 and the rigidity thereof is used for prestressing the blade 1. FIG. 11 shows the blade 1 being guided into the tower 22, thereby "straightening out" the blade 1. In order to protect the blade 1, a plurality of fittings 23 with spacers 24 are mounted suitably interspaced and adapted to the respective tower diameter. These spacers 24 may be provided with wheels or suitable collector shoes or slide shoes arranged around the blade 1 such that the inner surface of the tower section 22 supports the blade 1.

Figures 12, 13:
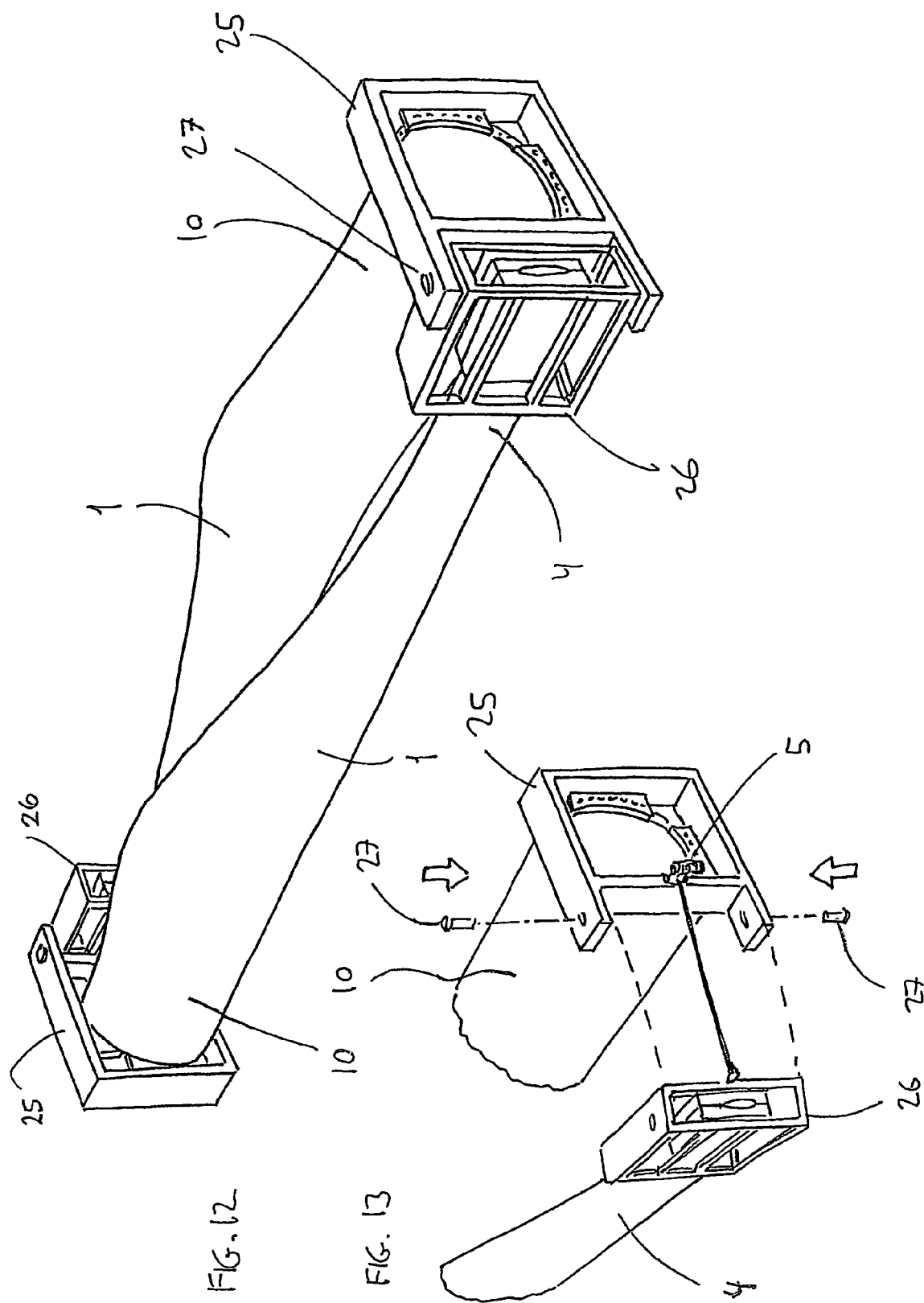
FIG. 12 is two wind turbine blades being prestressed against each other.
FIG. 13 is details of FIG. 12.

Finally, FIG. 12 shows a solution where two blades 1 are prestressed towards each other. The blades 1 are mounted in a first frame 25 at the root 10 and in a second frame 26 at the tip 4. With suitable winch arrangements 5 arranged between a root 10 on a first wind turbine blade 1 and a tip 4 on a second blade 1, the blades 1 are prestressed into a storing and/or transportation position. In a preferred embodiment, this system is adapted to being fixed in the prestressed position by means of locking bolts 27. The frames 25, 26 may be adapted by not-shown means allowing for the stacking of blades 1 packed in pairs.

FIG. 13 shows details during the prestressing process according to this solution and where the locking bolts 27 are shown in the unmounted state. By using this solution, it is only possible to prestress one end, however, various conditions may require a prestressing in both ends.

Naturally, considerable force is required for prestressing a modern wind turbine blade of fibreglass-reinforced polymer. Tests with a 44.5 meter long wind turbine blade have shown that loads of 3.8 tons, 7.5 tons, 11,0 tons and 14, 8 tons are required to straighten out the blade tip by 1, 2, 3 and 4 meters, respectively. The blade was loaded on six positions in the direction of the blade from 15 meters from the blade root to the blade tip, the strain being reduced concurrently with the distance from the blade tip. The greater the curvature of a blade, the heavier force is often required to bring the blade into a position allowing the blade to be transported by a truck.

Hitherto, wind turbine blades have not been provided with large curvatures for transportation considerations, but according to the invention it is now possible to provide blades with much larger curvatures than hitherto as the transportation and storage problems have been solved by this invention.

By using the apparatus and the method of the invention, the blade tip may be prestressed so as to be arranged for example 1, 2, 3, 4, 5, 6, 7, 8, 9, 10, 20 or even 30 meters closer to the longitudinal central axis of the blade root.

The invention is not limited to the embodiments described above.

The invention claimed is:

1. A method of transporting and storing a wind turbine blade comprising:
   providing a wind turbine blade including a blade root having a longitudinal central axis and a blade tip, where the wind turbine blade curves in an unloaded state in such a manner that the blade presents a substantially concave face and a substantially convex face, and such that said blade tip is spaced apart from the longitudinal central axis of said blade root; and
   prestressing the wind turbine blade at a distance from the blade root in such a manner that the blade tip is brought closer to the longitudinal central axis of the blade root.

2. A method according to claim 1, wherein the wind turbine blade is prestressed to such an extent that a distance between the blade tip and the longitudinal central axis of the blade root does not exceed twice a radius of the blade root.

3. A method according to claim 1, wherein the prestressing is accomplished by a prestressing means which includes a counterpart extending substantially parallel to the blade, said prestressing means further including prestressing members for forcing the substantially concave face of the wind turbine blade towards the counterpart.

4. A method according to claim 3, wherein the counterpart is resilient and curved and is positioned substantially parallel to the wind turbine blade in such a manner that said counterpart curves in a direction opposite the wind turbine blade, whereby the counterpart and the wind turbine blade are forced towards each other by means of the prestressing members.

5. A method according to claim 3, wherein the counterpart is substantially rectilinear and substantially rigid, and that the wind turbine blade is forced towards the counterpart by means of the prestressing members.

6. A method according to claim 3, wherein the counterpart includes abutment members with a surface corresponding to a surface of the blade and preventing said wind turbine blade from being damaged.

7. A method according to claim 4, wherein the resilient counterpart is formed of a second curved wind turbine blade upended in relation to the first recited blade, whereby the roots of the two blades are secured in respective first frames, and whereby the tips of two blades are secured in respective second frames, and where said first frame of said first blade and said second frame of said second blade are secured to each other, and where said second frame of said first blade and said first frame of said second blade are subsequently forced towards each other and secured to each other.

8. A method according to claim 1, wherein the prestressing means include a cable secured to the blade at a position adjacent to the blade tip and positioned so as to extend along the substantially convex face of the blade, said cable being tightened in such a manner that the blade tip is arranged closer to the longitudinal central axis of the blade root.

9. A method according to claim 8, wherein a blade tip fitting for the blade is fastened adjacent to the blade tip, the cable being secured to said fitting.

10. A method according to claim 8, wherein a cable guide fitting is fastened between the blade tip and the blade root, the cable abutting said cable guide fitting at a distance from a surface of the blade to ensure an effect of a compressive force component perpendicular to the substantially convex face of the blade.

11. A method according to claim 9, wherein the blade tip fitting and a cable guide fitting are inter-connected by means of hinges with a distance beam ensuring a constant distance between said blade tip fitting and said cable guide fitting.

12. A method according to claim 1, wherein the blade is positioned with the substantially concave face facing downwards and that at least the blade root is supported, the prestressing being accomplished by a prestressing means which is formed by ballast means positioned on or in the blade at a distance from the blade root.

13. A method according to claim 1, further comprising transporting the prestressed wind turbine blade utilizing a tractor unit and a trailer or semi-trailer, formed integral with a counterpart towards which the blade is forced.

14. An method according to claim 2, wherein the distance between the blade tip and the longitudinal central axis of the blade root does not exceed the radius of the blade root.

15. A method according to claim 12, wherein the prestressing means comprises inner ballast tanks provided in the blade at a distance from the blade root, said tanks being adapted to being filled with ballast material, in such a manner that the blade tip is brought closer to the longitudinal central axis of the blade root due to gravity on the ballast means, when the blade is positioned with the substantially concave face facing downwards and is supported adjacent to at least one of the blade root and the blade tip the blade tip.

16. A method according to claim 12, further comprising transporting the prestressed wind turbine blade utilizing a tractor unit and a trailer or semi-trailer and wherein the ballast means comprises the trailer or semi-trailer formed integral with a counterpart towards which the blade is forced.

* * * * *